Aug. 8, 1933.   J. B. WEBB ET AL   1,921,109
CONVEYER SYSTEM
Filed Sept. 12, 1929    4 Sheets-Sheet 1

INVENTORS
Jervis B. Webb and
Duane A. Blair
BY
ATTORNEY.

Aug. 8, 1933.  J. B. WEBB ET AL  1,921,109
CONVEYER SYSTEM
Filed Sept. 12, 1929    4 Sheets-Sheet 3

INVENTORS
Jervis B. Webb and
Duane A. Blair
BY
Charles R. Halbert
ATTORNEY.

Aug. 8, 1933.                    J. B. WEBB ET AL                  1,921,109
                                  CONVEYER SYSTEM
                           Filed Sept. 12, 1929          4 Sheets-Sheet 4

INVENTORS
Jervis B. Webb and
BY  Duane A. Blair
Charles R. Halbert
ATTORNEY.

Patented Aug. 8, 1933

1,921,109

UNITED STATES PATENT OFFICE 1,921,109

CONVEYER SYSTEM

Jervis B. Webb, Royal Oak, and Duane A. Blair,
Detroit, Mich.

Application September 12, 1929
Serial No. 392,104

14 Claims. (Cl. 104—95)

This invention relates to conveyer systems, and particularly to an endless or continuous system for transporting at will objects, articles, or devices upon which various operations are being performed, to any desired part of a plant.

It is an object of the invention to provide a conveyer system which is adapted generally for use in industrial plants wherever it is necessary or desirable to move articles to various places therein.

A special object is to provide such a system comprising a power-propelling portion and a load-carrying portion which are so co-ordinated with each other as to permit continuous operation of the power chain so as to render available at all times power means for moving loads while at the same time rendering it possible to disconnect any desired number or character of the said loads from the power-propelling means and maintaining the same stationary without stopping the propelling portions of the systems. It is also an object to so correlate the said propelling and load-carrying portions that the strains incident to heavy loads upon the load-carrying portions will not be communicated to the propelling parts, thus increasing their efficiency, dependability and life.

It is also a special object to provide a conveyer system which is extremely flexible so far as lending itself to the simultaneous handling of various kinds of loads, permitting any number of loads to be moved or maintained stationary, as may be desired, and allowing variations in the periods over which said loads may be kept stationary thus rendering it possible to perform different operations requiring longer or shorter periods upon different types thereof, all without stoppage of the propelling means, without interference between the moving and stationary loads, and regardless of the differences in the operations being performed thereon.

It is a further special object to provide a conveyer system of this character which will avoid the necessity of unloading and re-loading in order to temporarily retain certain articles or devices at any particular location of the plant, or for purposes of storage at such locations, one which minimizes the handling of the various types of loads while transporting them from place to place throughout the plant, one which will readily permit the placing of the load either adjacent the floor or at elevated positions so as not to interfere with the floor space during storage thereof, and one which will eliminate the necessity for the use of trucks in removing loads from the immediate vicinity of the power-applying line and returning the same thereto.

Additional special objects are to dispose the trolleys supporting the power-applying chain in vertical alignment with the load-carrying trolleys so as to apply the power on the center line of the loads and avoid undesirable side thrusts which cause binding of the parts or increased friction due to the skewing thereof, which feature is of particular importance in the handling of excessively heavy loads; to eliminate the necessity for periodic starting and stopping of the power-transmitting chain, thus dispensing with the use of expensive and delicate mechanisms frequently found in systems of this nature and obviating the inconvenient shut-downs occasioned by such parts getting out of order; and to provide means for transmitting the power from the endless conveyer chain to the load-carrying trolleys, which while effectively performing this function, at the same time permits accommodation of the several parts to the changes in relative disposition of the load-carrying trolleys and the conveyer chain due to sagging of the load-carrying trolley tracks under heavy loads.

Still other special objects are to provide a conveyer system in which the trolleys for supporting the power-transmitting means is superposed above the tracks carrying the load-supporting trolleys, said tracks being equipped with auxiliary or shunt lines which can be operatively connected or disconnected at will with the main line whereby any specific character or number of loads can be diverted from and returned to the main line at desired points; to provide a novel and convenient type of switch mechanism for diverting loads to said auxiliary trackway and for returning them to the main line or trackway, as well as a particularly effective locking means for holding the switches employed in their different positions; to provide means which are automatically brought into operation upon the shifting of the said switch means which will prevent accidental displacement or discharge of the load-carrying trolleys from the main and auxiliary trackways; and to provide means for holding the track sections of the switch mechanism in properly spaced position at all times while permitting relative movement thereof longitudinally of each other during the shifting of the switch to its different positions.

These and other objects of the invention will be apparent from the following description and the appended claims, in connection with the drawings forming a part of this application.

Referring specifically to the drawings.

The improved conveying system generally comprises a constantly actuated propelling mechanism supported from a track beam, a main trackway positioned below the track beam and extending throughout the entire plant, a plurality of auxiliary trackways located at convenient or desirable places along the length of the main trackway, and switch mechanisms for selectively diverting load-carrying trolleys from the main trackway onto the several auxiliary trackways and for returning the said load-carrying trolleys from the auxiliary trackways to the main trackway.

Figure 5:
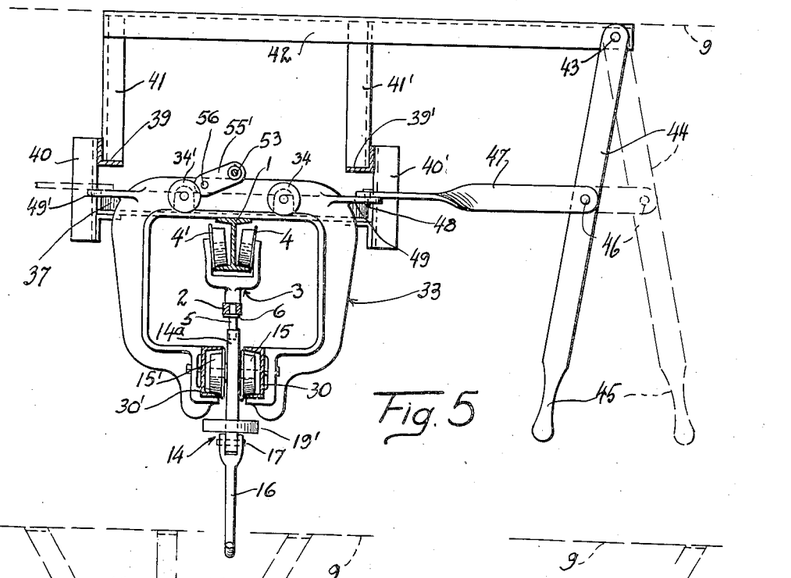
Fig. 5 is a vertical transverse sectional view taken substantially on the line 5—5 of Fig. 2.
Figure 6:
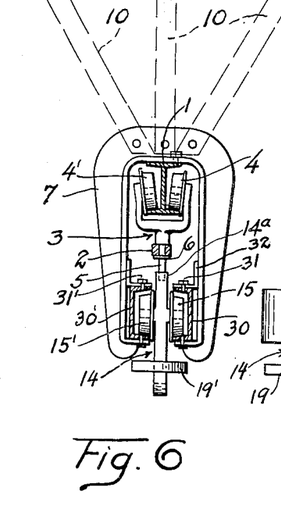
Fig. 6 is a similar view taken on the line 6—6 of Fig. 2.
Figure 7:
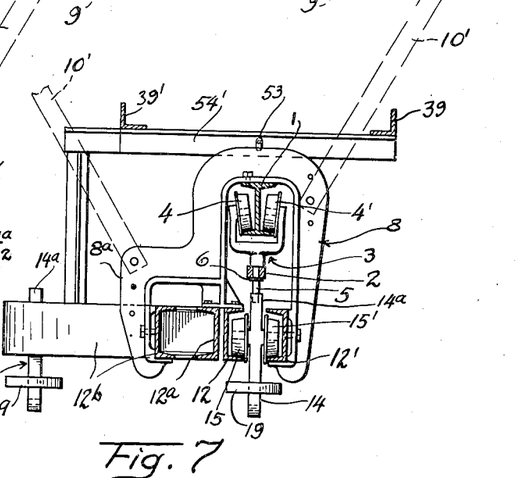
Fig. 7 is another view of the same character taken on the line 7—7 of Fig. 2.

In the drawings, 1 represents the track for carrying the trolleys for supporting the propelling chain 2, the said trolleys being indicated generally by the reference numerals 3. The track 1, as clearly indicated in Figs. 5 to 7, is preferably in the form of an I-shaped beam, the trolley wheels 4, 4', resting upon and being carried by the base flanges of the beam.

The chain 2 may be of any suitable construction, and is endless or continuous as is common to conveyer systems of this general type, the chain being operatively connected with any desirable type of driving mechanism, not shown, for moving the chain and applying power to the loads to be transported. As shown in the drawings, the frames of the trolleys 3 are equipped with depending portions 5 which project downwardly through the links of the chain, and are connected thereto by collars or anchoring pins 6 associated with the depending portions 5.

The track beam 1 is suspended from hanger brackets 7 and 8 located at conveniently spaced intervals, those of the character indicated at 7 being provided throughout the length of the track 1, while those of the type indicated at 8 are provided adjacent the terminal of an auxiliary trackway. The hangers 7 and 8 are in turn suspended from the ceiling 9 by hangers such as indicated by the reference numerals 10, 10'.

Located at a predetermined distance below the track 1 is a main load-carrying trackway indicated generally by the reference numeral 11. The trackway 11 comprises two spaced apart channel members 12, 12', leaving a space between them which is in direct vertical alignment with the track beam 1 and the depending portions 5 of the trolley members for the propelling chain 2. The main trackway 11 is suspended by means of the hanger brackets 7 and 8, resting upon arms of the hangers which extend below and partially embrace the channel members, as well as by the aid of any suitable fastening devices such as the bolts 13.

The channel members 12 and 12' are arranged oppositely with their horizontal flanges extending toward each other whereby to permit the lower flanges thereof to act as supporting tracks for load-carrying trolleys indicated generally by the reference numerals 14. These load-carrying trolleys, like the trolleys for supporting the propelling chain, are equipped with wheels at the opposite sides of the trolleys frame, the wheels co-operating with the track provided by the channel member 12 being indicated at 15 while those at the opposite sides co-operating with the track provided by the channel member 12' are indicated by the numeral 15'.

Portions of the frame of the load-carrying trolleys 14 extend downwardly below the sections of the main trackway and have depending therefrom and connected therewith in any suitable fashion, the work-holding or carrying elements 16. In the embodiment shown in the drawings, the elements 16 are in the form of hooks pivoted to the trolley frames at 17, and provided at their lower extremities with the oppositely extending lateral projections 18, 18'. There is also attached to each of the frames of the load-carrying trolleys at a point immediately above the pivotal connections 17, spring loops 19, 19' which serve as spacing bumpers to keep adjacent load-carrying trolleys sufficiently far apart to prevent interference between the loads supported upon the lateral projections 18, 18', as well as serving to prevent undue shocks when load-carrying trolleys move into juxtaposition to each other, and co-operating with stop means employed in connection with switch devices, as will more clearly appear from the subsequent description thereof.

The frames of the load-carrying trolleys 14 are provided with upwardly extending portions 14ª which are preferably located in vertical alignment with the space or recess between the sections of the main trackway, as well as in vertical alignment with the depending portions 5 of the trolleys for supporting the propelling chain. The track beam 1 and the main trackway 11 are so positioned relative to each other that the portions 5 and 14ª overlap in abutting relation, there being, however, no mechanical connection therebetween, so that the said parts may readily accommodate themselves to any variations which may be incident to the installation of the system, as well as accommodating the load-carrying trolleys to the propelling mechanism in the event that sagging of the load-carrying tracks of the main trackway occurs under heavy loads. By placing the depending portions 5 and the upwardly extending portions 14ª in vertical alignment with each other as well as in a vertical plane extending through the centers of the track beam 1 and the space between the sections of the main trackway 11, the application of power at the center lines of the loads is always assured, thus obviating any tendency of the parts to bind, preventing skewing thereof and reducing friction to the minimum.

Figure 10:
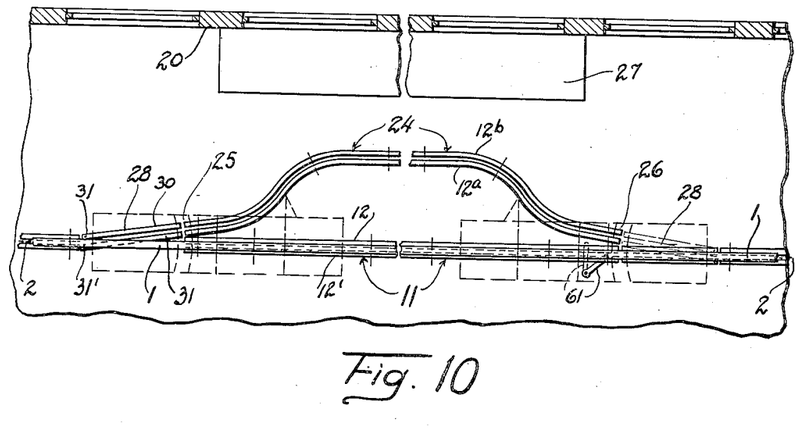
Fig. 10 is a schematic view of a portion of a building in which the improved conveyer system is installed, illustrating the relative dispositions of the main and auxiliary trackways, together with the switch mechanisms for diverting the load-carrying trolleys away from and returning the same to the main trackway.
Figure 11:
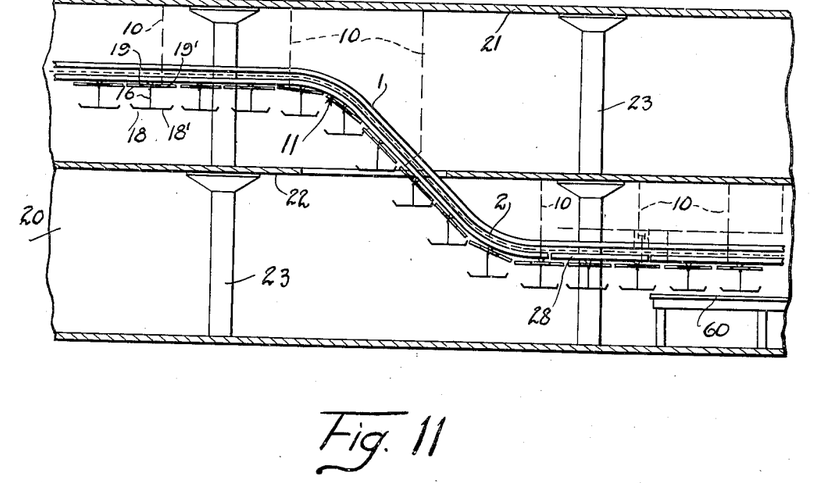
Fig. 11 is a similar view, illustrating two floors of the building, and the layout of the trackways for conveying the loads to floors at different elevations.

As illustrated in Figs. 10 and 11 of the drawings, the track 1, the main trackway 11, and the power-applying or propelling chain 2 extend throughout the various portions of the plant or building to which the articles or devices being transported are to be conveyed, the wall of the building depicted in Fig. 10 being indicated at 20. Fig. 11 illustrates how the conveyer system extends between floors of a building located at different elevations, two floors of the building being indicated in this figure, the ceiling of the upper floor being shown at 21 and that of the lower floor at 22, with the vertical supporting posts or pillars 23 located at suitably spaced intervals, all of which will be apparent from an inspection of the drawings.

Fig. 10 also best illustrates the auxiliary trackways employed for receiving the load-carrying trolleys diverted from the main trackway, and for storing the same until it is desired to return them to the main trackway. One of such auxiliary trackways is indicated generally at 24, and as shown in the said figure, it terminates adjacent to and at one side of the main trackway as at 25, its opposite end being located in similar position with respect to the main trackway at a point removed therefrom as at 26. The auxiliary trackways are suitably suspended as by brackets of the same general type as the brackets 7 previously described, but for the sake of clearness these have not been illustrated in the drawings.

27 indicates a work table or restricted section of the plant at which special operations are carried on in connection with loads being transported, said restricted area for convenience being indicated as opposite the central portion of the auxiliary trackway 24. It will be understood that although but a single section of auxiliary trackway has been illustrated, similar sections will be located at various places throughout the plant at which it is desired to carry on operations upon the articles or devices, and as many of these may be provided as is found necessary or desirable in carrying on either a series of different operations upon the same articles, or operations of different characters upon various articles which are conveyed or transported from place to place over the conveyer system.

The auxiliary trackways, like the main trackway 11, are made up of suitably spaced apart channel members indicated by the reference characters 12ª and 12ᵇ, and the terminals of the auxiliary trackways are adapted to be supported by an extension or arm 8ª on the hanger brackets of the type indicated by the numerals 8, and illustrated specifically in Fig. 7 of the drawings. Preferably the portions of the channel members 12 and 12ª adjacent the terminals of the auxiliary trackways are located in closely spaced relation in order to render the structure compact at these points as well as to facilitate the functioning of the switch mechanism to be hereinafter described.

Immediately adjacent the terminals of the various auxiliary trackways which are employed in connection with the conveyer system, and interposed in the main conveying line or trackway 11, are gaps which are bridged by switch mechanisms adapted to be selectively swung to positions either in registry with the main trackway or the auxiliary trackway, as may be desired.

Two of such switch mechanisms are illustrated in Fig. 10, being indicated at 28, the switch mechanism at the left hand side of said figure being swung to a position whereby to bring it into registry with the auxiliary trackway at its terminal 25, while that illustrated at the right hand side of said figure has been positioned in registry with the main line or trackway 11.

Each of these switch mechanisms comprise two spaced apart switch members 30 and 30' in the form of channel tracks preferably corresponding in size and relative disposition to those of both the main and auxiliary trackways. One end of each of these switch members is pivoted about a fixed point in longitudinal alignment with the track members of the main trackway, the switch member 30 being pivoted on an axis 31 in longitudinal alignment with the channel member 12, and the switch member 30' being similarly pivoted as at 31' in longitudinal alignment with the channel member 12'. As clearly shown in Fig. 6, these pivotal connections may be conveniently positioned directly on the hanger brackets 7 or angle members such as 32 connected thereto. The free ends of the switch members 30, 30', opposite their points of pivotal connection are supported by means of a bodily movable hanger bracket such as shown generally at 33, the lower ends of the arms of this bracket extending below and partially embracing the respective switch members.

The upper flanged portion of the hanger bracket 33 is provided at its opposite sides with supporting wheels such as are shown at 34, 34', 35 and 35', thus in effect forming of the upper portion of the said hanger bracket a truck for shifting the free ends of the switch members into their different positions. The wheels of this truck co-operate with spaced tracks 36 and 37, such tracks being in the form of angle members resting adjacent their central portions upon the track beam 1, the wheels 34 and 34' co-operating with the horizontal flange of the track 36 while the wheels 35, 35' correspondingly co-operate in a similar fashion with the horizontally extending flange of the track 37. As shown the angle members 36 and 37 are curved throughout their length upon an arc struck substantially from a center located between the pivotal connections 31, 31'. The opposite ends of the track 36 have rigidly connected thereto the upwardly extending angle members 38, 38', the upper ends of which are connected respectively to the horizontally extending angle members 39, 39', forming a portion of a superposed framework. The opposite ends of the track member 37 are likewise connected with the upwardly extending angle members 40, 40' which are in turn also connected to the horizontally extending members 39, 39' which have rising therefrom the uprights 41, 41' which support the transversely extending frame member 42, the extremity of which extends laterally beyond the track 1 and the main auxiliary trackways, and has pivoted thereto as at 43 the upper end of a depending shifting lever 44, fashioned in the form of a handle 45 at its lower end. The intermediate portion of the shifting lever 44 is pivotally attached at 46 to one end of a link 47 having its opposite end pivoted at 48 to a lug 49 formed integrally with the hanger bracket 33.

The free ends of the switch members 30, 30', are attached to the hanger bracket 33 so as to maintain said free ends a substantially fixed distance apart by means of stud bolts 50 anchored to the sides of the members 30, 30' and having their body portions extending through elongated openings 51 in the arms of the hanger brackets, and their heads of somewhat greater dimension than the width of said elongated openings. Also attached to the lower portion of the hanger bracket 33, in proximity to the end of the switch, and extending below and laterally from the bracket is a stop such as indicated at 52.

Locking means are provided for holding the free ends of the switches in registry with the main trackway and auxiliary trackways. Such locking means comprises a resilient rod 53 having its free opposite ends projecting through apertures in the transversely extending angle members 54, 54' fixed to the superposed framework, previously described. The intermediate portion of said resilient rod 53 passes through one extremity of a link indicated generally by the reference numeral 55, the said link consisting of two members 55' and 55", the opposite ends of which are pivoted to the vertical flange of the hanger bracket 33 at 56. The rod 53 is held against bodily longitudinal movement by means of the collars 57, 58, and 59, collar 58 being located between the two link sections 55' and 55" for maintaining their free ends in suitably spaced relation, while the collars 57 and 59 are located at the opposite sides of the link 55, such collars being held in position upon the rod by any suitable means such as set screws.

The relative dispositions of the apertured members 54 and 54' through which the ends of the rod 53 extend, and that of the intermediate portion of the rod connected to the link 55 when the link has been swung to either of its extreme positions about its pivotal connection 56 are such as to bring the spacing collar 58 into contact with the hanger bracket 33 and to maintain the rod in slightly bowed condition whereby to exert a tension upon the free end of the link urging it towards the said hanger bracket. The parts are so proportioned that when the link is thus urged into its said extreme positions the bodily movable bracket 33 will be held in proper position to bring the switch members 30, 30' into substantial longitudinal alignment with the track members 12, 12' of the main trackway, or the track sections 12$^a$ and 12$^b$ of the auxiliary trackway as the case may be, thus keeping the switch parts and the parts of the trackways in operative relation until the switch mechanism is again forcibly moved under application of power applied to the actuating lever 44.

For simplicity, but a single actuating lever and its connections with the movable hanger bracket 33 have been illustrated and described, as located at one side of the main trackway. It is obvious, however, that if desired, a plurality of such actuating levers may be connected to the said bracket, or located at the opposite side of the trackway, and in order to readily provide for such additional installations, the hanger bracket 33 is equipped with a laterally extending lug 49' located thereon opposite the lug 49.

Figure 1:
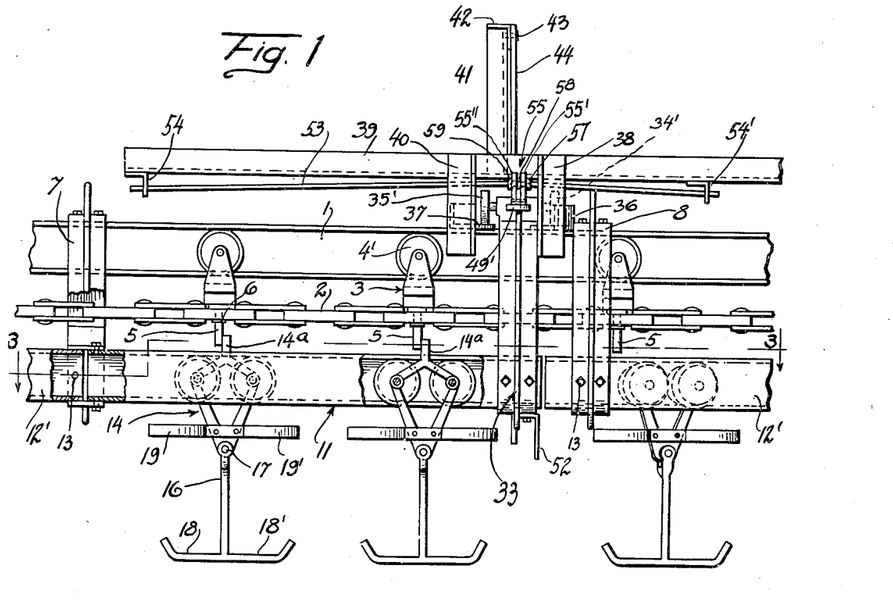
Fig. 1 is a fragmentary elevational view of a portion of the conveyer system, illustrating the switch mechanism and the means for holding the switch in its selected positions.

As previously noted, the propelling chain 2 is installed within the building or throughout the plant in which the conveyer system is used in the usual continuous or endless fashion, so that the chain may be constantly driven by any suitable mechanism or gearing adapted for this purpose. The normal direction of travel of the chain 2 is to the right, as viewed in Fig. 1 of the drawings.

Sections of auxiliary trackways 24 are located at whatever points, and at any desired number of places, as is found desirable throughout the entire plant, and are normally provided at locations where specific operations upon the devices carried by the system are to be performed, and at places where it may be desired to store devices, either temporarily or permanently.

The operation of the system is as follows:—
Assuming the articles to be transported to be engaged with the work carrying hooks 16 of the respective load-carrying trolleys, and the said trolleys to be driven by the abutting contact between the depending portions 5 and the upstanding portions 14$a$ in a direction toward the right, as viewed in Fig. 10, if it is desired to shunt any particular load, or any desired number of loads, to an auxiliary track, it is simply necessary to shift the appropriate switch mechanism to the position illustrated at the left in Fig. 10. The load-carrying trolleys will then be forced to travel from the main trackway over the sections of the switch mechanism onto the tracks of the auxiliary trackway. In the event that it is desired to transport trolleys past any auxiliary trackway, it is merely necessary to position the switch mechanism so as to be maintained in registry with the main trackway, or in the position illustrated at the right in Fig. 10. It is thus apparent that if different characters of operations are beng performed on the articles being transported at various places throughout the plant, that the loads may be diverted at will, either in accordance with their character or number so as to be subjected to the desired operation at any particular location. If a series of operations are being successively performed upon the articles, it is merely necessary to provide a corresponding number of auxiliary trackways for the various operations to be performed and to successively divert the loads at the respective locations to accomplish that purpose.

It is also noted that regardless of the time period which may be required for any particular operation, the loads may be detained merely a period sufficient to accomplish that purpose, and entirely independent of the time periods which may be required at some other location in the plant. In this way, different operations upon various kinds of materials may be carried on simultaneously throughout the entire plant, all without interference with the others, and without the necessity for starting and stopping the power-propelling portions of the conveyer system.

The system also readily lends itself not only to the temporary retention of specific characters or numbers of loads, for the carrying out of some particular operation thereupon, but provides a convenient means for storage at various places throughout the plant, and such storage may be either temporary or permanent as is desirable.

Referring specifically to Fig. 10 of the drawings, it will be understood that after loads have been diverted from the main trackway to the auxiliary trackway, in order to return them from the auxiliary trackway to the main trackway the switch mechanism indicated at the right hand side of said figure is shifted from its full line position to its dotted line position whereby the various load-carrying trolleys may be shunted from the auxiliary trackway back upon the main trackway. It will also be understood that in the system illustrated herein the loads are manually moved from the switches on to the auxiliary trackways and likewise returned to the main trackways to a point where the depending portions 5 of the advancing chain-supporting trolleys will be brought into contact with the upwardly extending portions 14a of the returned load-carrying trolleys.

The flexibility of the system is very pronounced not only in the respects above noted, but also in that the trackways may be located at any convenient vertical position for the purpose desired. If it is desired to have the articles conveniently suspended over a work table or other restricted area, the main and auxiliary trackways may be positioned such as illustrated at the lower portion of the right hand side of Fig. 11, the table being indicated at 60. Should, however, it be desired to divert the loads simply for storage purposes, it is obvious that the trackways may be located adjacent the ceiling whereby to leave entirely unobstructed the floor space at such points.

Figure 2:
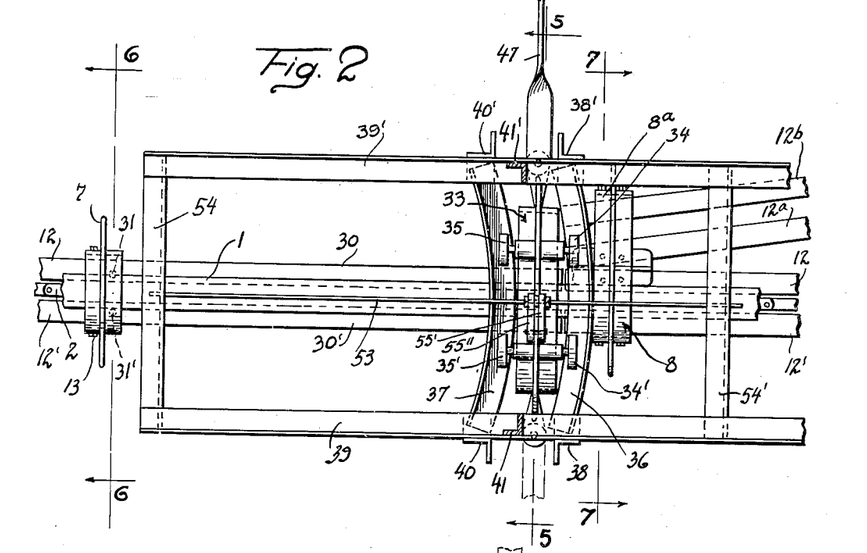
Fig. 2 is a top plan view, with parts in section, of the portions illustrated in Fig. 1.

The relative positions which the switch parts assume with respect to the main and auxiliary trackways, when the switch is in registry with the main trackway, is shown in Figs. 2 and 5, the actuating lever 44 being moved to the left as viewed in Fig. 5. Under these circumstances, the resilient rod 53 in urging the free end of the link 55 towards the hanger bracket 33, operates through the pivotal connection 56 at the inner end of the link 55 to maintain the hanger bracket in the position shown in this figure, causing the switch members 30, 30' to lie in substantial longitudinal alignment with the respective tracks of the main trackway. When the parts are thus positioned, the stop member 52 is maintained opposite the terminal of the auxiliary trackway whereby to prevent the escape of any load-carrying trolleys which may be positioned on the auxiliary trackway due to the fact that the spring bumper bars 19, 19' of the load-carrying trolleys will abut the said stop member, thus preventing escape of the trolleys from the trackway.

Figure 3:
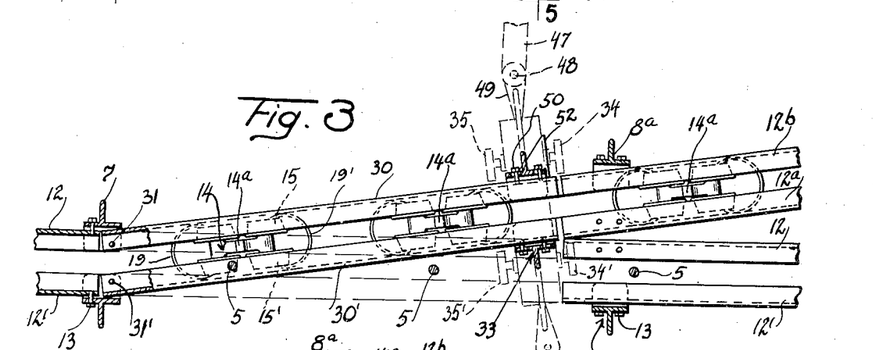
Fig. 3 is a sectional view taken substantially on the line 3—3 of Fig. 1, illustrating the positioning of the switch for diverting the load-carrying means from the main trackway to the auxiliary trackway.
Figure 4:
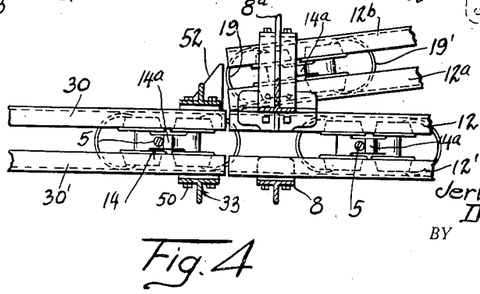
Fig. 4 is a fragmentary view of portions of the switch mechanism, the main trackway and auxiliary trackway, illustrating the parts in position for transmitting the load-carrying trolleys along the main trackway.
Figure 8:
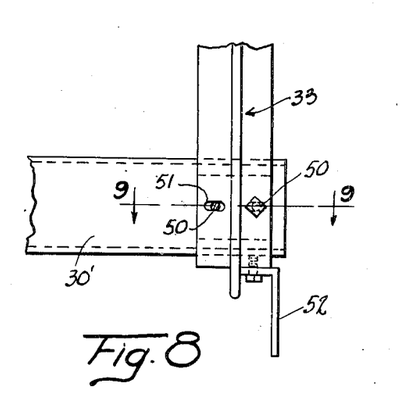
Fig. 8 is a fragmentary detail elevational view on an enlarged scale showing the method of connecting the switch members to the movable bracket for suspending the same.
Figure 9:
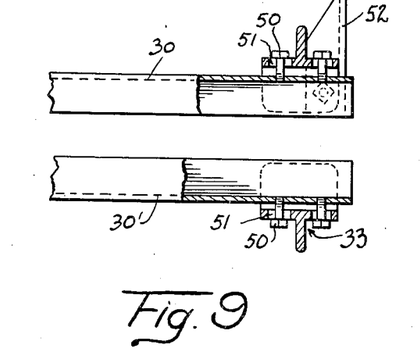
Fig. 9 is a sectional view illustrating the same parts and taken on the line 9—9 of Fig. 8.

To shift the switch mechanism from the position just above described to that indicated in full lines in Fig. 3 for the purpose of bringing the free ends of the switch into registry with the auxiliary trackway, it is merely necessary to move the actuating lever 44 from its full line position to its dotted line position as indicated in Fig. 5. During this shifting movement, it is obvious that the entire hanger bracket 33 is bodily drawn transversely of the track beam 1 and the main trackway, the truck wheels 34, 34', 35 and 35', permitting ready shifting due to the co-operation thereof with their supporting tracks 36 and 37. The free ends of the switch members 30, 30', being suspended and movable with the bracket hanger 33, are thus carried from position in registry with the main trackway to one in registry with the auxiliary trackway. During this shifting movement, because the extremities of the spring rod 53 are held against transverse movement, the bodily movement of the link 55 due to its pivotal connection at 56 with the hanger bracket, causes the spring rod to be sufficiently bowed to permit the shifting of the link parts from the position shown in full lines to that shown in dotted lines in Fig. 5 of the drawings, and as above explained, the dimensions and dispositions of the parts are so selected that upon the completion of such shifting movement, the switch members 30, 30', are held in substantially longitudinal alignment with the track sections of the auxiliary trackway. during the swinging of the switch members about their pivotal supports 31, 31', the free ends thereof are maintained in proper spaced relation by the pin and slot connections 50, 51, illustrated in Figs. 8 and 9, and due to the elongation of the slots 51 relative longitudinal shifting of the switch members 30, 30', with respect to each other, is permitted so that the various parts will properly accommodate themselves to the change in the position of the switch.

By supporting the trolleys for carrying the power-propelling chain upon the track beam 1, and supporting the load-carrying trolleys independently of the propelling means, strains thrown upon the system due to loads placed upon the load-carrying means are prevented from being directly communicated to the propelling means. Also, due to the fact that the propelling means may be constantly operated without interfering with the selective distribution of the loads to various places in the plant, or for detention at such places over irregular intervals, it becomes unnecessary to provide expensive and delicate devices which are frequently found in systems requiring the frequent periodic stopping and starting of the propelling means, and thus giving rise to frequent delays and necessary expense in keeping such mechanisms in proper working condition. On the other hand, in the instant system because of the employment of propelling means which may be constantly operated, the cost of power for operating the system is reduced to a minimum.

Under some circumstances, and in installations for certain purposes, it may be found desirable to render the system fool proof against jamming of loads at the take off switch shown at the right side of Fig. 10, that is, at the switches for returning the load-carrying trolleys from the auxiliary trackway back to the main trackway. It is apparent that some difficulty in this respect might be occasioned due to the fact that load-carrying trolleys which are passed over the portion of the main trackway between the spaced switches shown in said figure might reach the switch gap before the take off switch has been completely shifted into full registry with the main trackway. Then, too, the nature of the required distribution of successive loads at times might bring about a similar result. To avoid this, suitable means for disconnecting the power from the propelling means and thereby stopping the travel of the propelling chain may be provided, said means being automatically actuated by the load-carrying trolleys on the main trackway upon reaching a point adjacent the take off switch prior to its being thrown into registry with the main trackway. Said means may include a pivoted member such as shown at 61 operatively connected with the take off switch or its actuating mechanism whereby to be swung into the path of travel of the load-carrying trolleys as soon as the switch is moved out of full registry with the main trackway, but to be maintained out of such path while the switch is in full registry. The pivoted member is in turn appropriately associated with the starting and stopping means for the propelling mechanism, for instance with the motor switch of the electric motors driving the chain 2.

The dotted line showing in Fig. 10 of the drawings illustrates the positioning of the member 61 in the path of travel of trolleys approaching the take off switch while the full line showing indicates the position to which it is moved upon shifting of the said switch into full registry with the main trackway. As the details of this safety mechanism forms the subject matter of a separate and independent invention it is shown but generally in the instant case.

It will thus be seen that the present invention provides an extremely flexible system which is adapted for numerous purposes, one which enables a highly selective distribution of the various loads transported, one which obviates the necessity of removing and again reloading articles which are stored at convenient locations throughout the plant, one which permits automatic accommodation of the load-carrying trolleys with respect to the propelling mechanism, one which avoids the throwing of undesirable strains upon the propelling mechanism due to heavy loads, and one which can be operated at a low cost.

While the preferred embodiment of the invention has been particularly illustrated in the drawings, and described in the accompanying specification, it is to be understood that various changes in structural details and in the specific arrangement of parts whereby to accomplish the purposes above set forth may be adopted without departing from the spirit of the invention and it is therefore not intended to limit the scope thereof beyond that defined by the appended claims.

We claim:

1. A conveyer system comprising a track, propelling means supported by said track, a main trackway located at a predetermined distance below and in vertical alignment with said track, an auxiliary trackway terminating at the side of said main trackway, load-carrying means adapted to be supported by said main and auxiliary trackways, portions of said propelling means being disposed in overlying abutting relation with said load-carrying means located on said main trackway, and switch means for diverting at will the load-carrying means from said main trackway to said auxiliary trackway.

2. A conveyer system comprising a track I-shaped in cross section, propelling means supported by said track, a main trackway including two spaced apart channel members facing each other and disposed a predetermined distance below and in vertical alignment with said track, an auxiliary trackway terminating at the side of said main trackway and including similarly spaced apart channel members, load-carrying means adapted to be supported by said main and auxiliary trackways, switch means for diverting at will the load-carrying means from said main trackway to said auxiliary trackway, the propelling means having a portion depending in vertical alignment with the space between the members of said main trackway, and said load-carrying means being provided with an upwardly projecting portion also in vertical alignment with the said space, said depending and upwardly projecting portions overlying in abutting relation.

3. A conveyer system comprising a track, propelling means supported by said track, a main trackway including two spaced apart channel members facing each other and disposed a predetermined distance below and in vertical alignment with said track, an auxiliary trackway terminating at the side of said main trackway and including similarly spaced apart channel members corresponding to those of the main trackway, a switch including two spaced apart channel members also corresponding to those of the said trackways, one end of each of the said switch members being pivoted and disposed in alignment with a member of said main trackway, the opposite free ends of said switch members being adapted to be brought at will into registry with the members of said main trackway and said auxiliary trackway, load-carrying members adapted to be supported by said trackways and means on said propelling means overlapping in abutting relation the said load-carrying means when the latter are located on said main trackway.

4. A conveyer system comprising a track, propelling means supported by said track, a main trackway including two spaced apart channel members facing each other and disposed a predetermined distance below and in vertical alignment with said track, an auxiliary trackway terminating at the side of said main trackway and including similarly spaced apart channel members corresponding to those of the main trackway, a switch including two spaced apart channel members also corresponding to those of the said trackways, one end of each of the said switch members being pivoted and disposed in alignment with a member of said main trackway, the opposite free ends of said switch members being adapted to be brought at will into registry with the members of said main trackway and said auxiliary trackway, means for maintaining the said switch members spaced a substantially fixed distance from each other while permitting shifting thereof longitudinally of each other, load-carrying members adapted to be supported by said trackways, and means on said propelling means overlapping in abutting relation the said load-carrying means when the latter are located on said main trackway.

5. A conveyer system comprising a track, propelling means supported by said track, a main trackway including two spaced apart channel members facing each other and disposed a predetermined distance below and in vertical alignment with said track, an auxiliary trackway terminating at the side of said main trackway and including similarly spaced apart channel members corresponding to those of the main trackway, a switch including two spaced apart channel members also corresponding to those of the said trackways, one end of each of the said switch members being pivoted and disposed in alignment with a member of said main trackway, a bodily movable bracket supporting the opposite free ends of the said switch members, means for shifting the said bracket to bring the switch members selectively into registry with the members of said main trackway and said auxiliary trackway, load-carrying members adapted to be supported on said trackways, and means for transmitting motion from said propelling means to the load-carrying means located on said main trackway.

6. A conveyer system comprising a track, propelling means supported by said track, a main trackway including two spaced apart channel members facing each other and disposed a predetermined distance below and in vertical alignment with said track, an auxiliary trackway terminating at the side of said main trackway and including similarly spaced apart channel members corresponding to those of the main trackway, a switch including two spaced apart channel members also corresponding to those of the said trackways, one end of each of the said switch members being pivoted and disposed in alignment with a member of said main trackway, a bodily movable bracket supporting the opposite free ends of the said switch members, said bracket being suspended from said track, means for shifting the said bracket to bring the switch members selectively into registry with the members of said main trackway and said auxiliary trackway, means for holding said bracket in position whereby to maintain the said registry, load-carrying members adapted to be supported on said trackways, and means for transmitting motion from said propelling means to the load-carrying means located on said main trackway.

7. A conveyer system comprising a main trackway including spaced apart track members provided with a gap interposed therein, an auxiliary trackway terminating laterally of said main trackway adjacent one side of said gap, said auxiliary trackway also including spaced apart track members, a switch positioned within said gap and bridging the same, said switch including switch members spaced apart a distance corresponding to the spacing of said track members, one end of each of said switch members being pivotally mounted and disposed in longitudinal alignment with the track members at one side of said gap, means for suspending the opposite free ends of said switch members and maintaining the same at a substantially fixed distance apart, said means permitting relative longitudinal movement between said switch members when swung about their pivotal supports and shifting means to selectively bring the switch members into registry with the track members of said main and auxiliary trackways.

8. A conveyer system comprising a main trackway including spaced apart track members provided with a gap interposed therein, an auxiliary trackway terminating laterally of said main trackway adjacent one side of said gap, said auxiliary trackway also including spaced apart track members, a switch positioned within said gap and bridging the same, said switch including switch members spaced apart a distance corresponding to the spacing of said track members, one end of each of said switch members being pivotally mounted and disposed in longitudinal alignment with the track members at one side of said gap, a bodily movable bracket for supporting the opposite free ends of said switch members and means for shifting said bracket to selectively bring the switch members into registry with the track members of said main and auxiliary trackways.

9. A conveyer system comprising a main trackway including spaced apart track members provided with a gap interposed therein, an auxiliary trackway terminating laterally of said main trackway adjacent one side of said gap, said auxiliary trackway also including spaced apart track members, a switch positioned within said gap and bridging the same, said switch including switch members spaced apart a distance corresponding to the spacing of said track members, one end of each of said switch members being pivotally mounted and disposed in longitudinal alignment with the track members at one side of said gap, a bodily movable bracket for supporting the opposite free ends of said switch members and means for shifting said bracket to selectively bring the switch members into registry with the track members of said main and auxiliary trackways, and means for locking said bracket in position whereby to maintain said registry with either of said trackways.

10. A conveyer system comprising a main trackway including spaced apart track members provided with a gap interposed therein, an auxiliary trackway terminating laterally of said main trackway adjacent one side of said gap, said auxiliary trackway also including spaced apart track members, a switch positioned within said gap and bridging the same, said switch including switch members spaced apart a distance corresponding to the spacing of said track members, one end of each of said switch members being pivotally mounted and disposed in longitudinal alignment with the track members at one side of said gap, a bodily movable bracket for supporting the opposite free ends of said switch members, and means for shifting said bracket to selectively bring the switch members into registry with the track members of said main and auxiliary trackways, a link pivoted at one end to said bracket and resilient means for urging the opposite end of said link towards said bracket, and means for limiting the movement of the last named end of said link towards said bracket.

11. A conveyer system comprising a main trackway including spaced apart track members provided with a gap interposed therein, an auxiliary trackway terminating laterally of said main trackway adjacent one side of said gap, said auxiliary trackway also including spaced apart track members, a switch positioned within said gap and bridging the same, said switch including switch members spaced apart a distance corresponding to the spacing of said track members, one end of each of said switch members being pivotally mounted and disposed in longitudinal alignment with the track members at one side of said gap, a bodily movable bracket for supporting the opposite free ends of said switch members and means for shifting said bracket to selectively bring the switch members into registry with the track members of said main and auxiliary trackways, a link pivoted at one end to said bracket, a resilient rod anchored adjacent said link and pivotally engaging the opposite end of said link for urging the link towards said bracket.

12. A conveyer system comprising a main trackway including spaced apart track members provided with a gap interposed therein, an auxiliary trackway terminating laterally of said main trackway adjacent one side of said gap, said auxiliary trackway also including spaced apart track members, a switch positioned within said gap and bridging the same, said switch including switch members spaced apart a distance corresponding to the spacing of said track members, one end of each of said switch members being pivotally mounted and disposed in longitudinal alignment with the track members at one side of said gap, a bodily movable bracket for supporting the opposite free ends of said switch members and means for shifting said bracket to selectively bring the switch members into registry with the track members of said main and auxiliary trackways, and a stop movable with said free ends of said switch adapted to be brought into alignment with the trackway out of registry with the switch.

13. In an endless conveyer system, an elevated track with two parallel rails, a section of said track having adjacent ends of its rails at one end pivotally attached, the other end of said section being laterally movable, a yoke shaped like an inverted U extending above said sections each limb of said yoke being secured at its lower end to a rail at the movable end of said section.

14. In an endless conveyer system, an elevated track with two parallel rails, a section of said track having adjacent ends of its rails at one end pivotally attached, the other end of said section being laterally movable, a yoke extending above said section and uniting the rails at the laterally movable end of said section and means acting through said yoke for moving said laterally movable end and means for locking the same at the end of its lateral movement.

JERVIS B. WEBB.
DUANE A. BLAIR.